W. G. MILLER.
WATER CLOSET.
APPLICATION FILED DEC. 24, 1908.
956,988. Patented May 3, 1910.
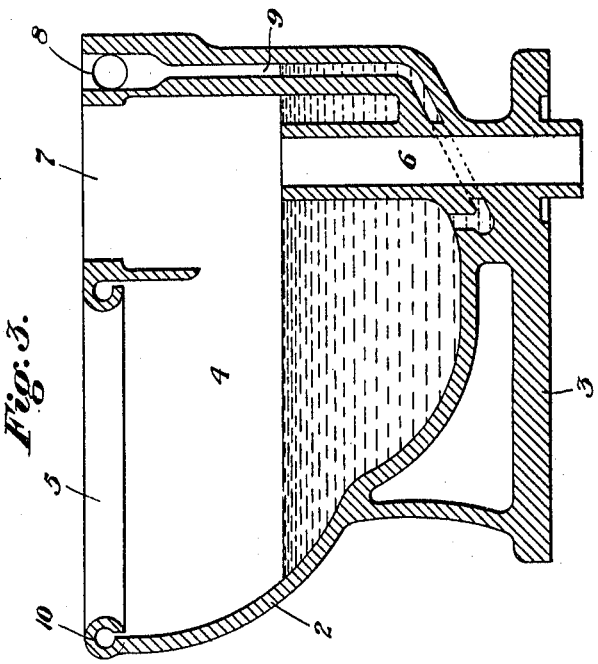
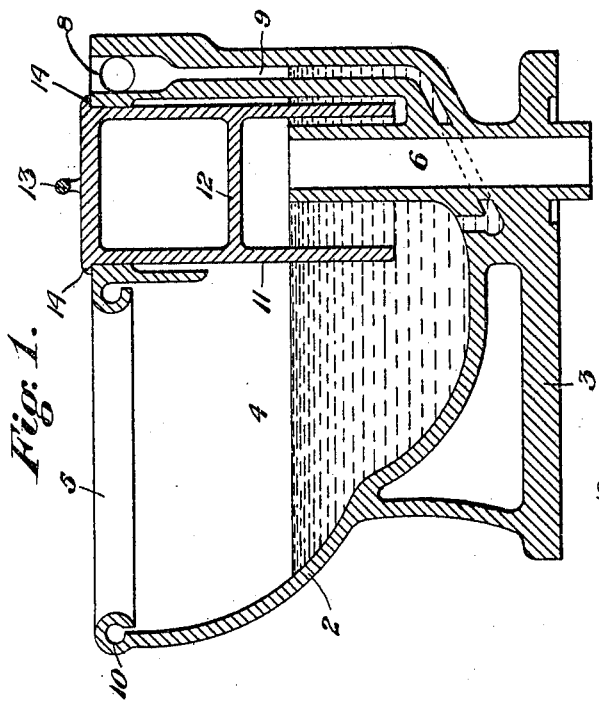
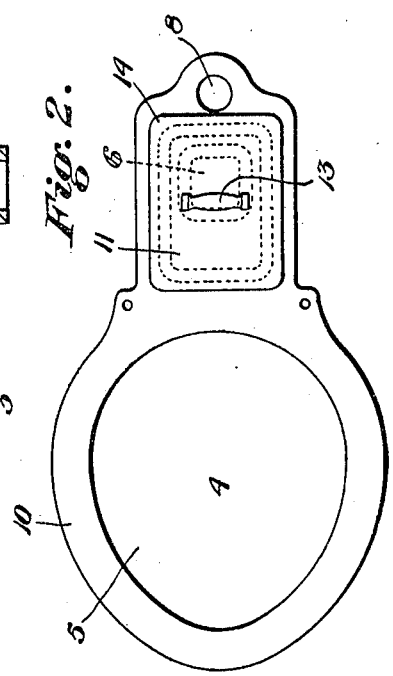

UNITED STATES PATENT OFFICE.

WILLIAM GORDON MILLER, OF ROSS TOWNSHIP, ALLEGHENY COUNTY, PENNSYLVANIA.

WATER-CLOSET.

956,988.  Specification of Letters Patent.  Patented May 3, 1910.

Application filed December 24, 1908. Serial No. 469,107.

*To all whom it may concern:*

Be it known that I, WILLIAM GORDON MILLER, a citizen of the United States, residing in Ross township, in the county of Allegheny and State of Pennsylvania, have invented certain new and useful Improvements in Water-Closets, of which the following is a specification, reference being had therein to the accompanying drawing.

My invention consists in an improvement in water closet bowls and is designed for the purpose of providing a construction in which the conduit leading from the bowl forms a siphon with a removable coping and in which the construction is adapted to provide for easy connection or separation of the parts, but principally to permit of the removal of any obstruction of the conduit. The device embodies a separable element adapted to operate with the upper terminal of the waste conduit to form an air and gas-tight siphon and trap, such element being so constructed that it may be readily and easily inserted or withdrawn and which will coöperate with the fixed portions of the bowl and its conduit to not only provide an efficient trap structure, but to permit of complete and successful flushing.

In the drawings:—Figure 1 represents a central vertical sectional view through a bowl made in accordance with my invention. Fig. 2 is a plan view of Fig. 1. Fig. 3 is a sectional view similar to Fig. 1 but showing the detachable water-seal portion removed. Fig. 4 is a detail sectional view of said portion.

2 represents the bowl which, in its entirety, is preferably made in a single piece, of any suitable material, provided with a base 3 for supporting it upon the floor, a main inner cavity 4, a seat opening 5 at the front portion, and at the rear portion with a downwardly extending conduit 6. As shown said conduit extends upwardly within the bowl cavity at its rear portion, a sufficient distance to always maintain the water therein at the desired level, as indicated in Figs. 1 and 3, while above the said conduit is an enlarged opening 7, which may be rectangular as shown, or of any other suitable design. The conduit may lead downwardly as shown, or may be of any other preferred design.

It will be understood that the bowl is provided with a suitable supply connection as at 8 for the water, which may pass downwardly into the bowl in any desired manner as by the conduit 9 from the rear portion and through the hollow roll top 10, from which it passes downwardly into the interior, as is commonly practiced in devices of this character.

11 is a removable coping, of shell form, having a hollow interior, adapted to be inserted downwardly within opening 7, as in Fig. 1, to embrace the upper portion of conduit 6, the walls of the coping extending downwardly into the bowl chamber below the top of the conduit as shown, and having a transverse air-tight partition 12 sufficiently above its lower edges to permit ample clearance for the siphoning flow from the bowl to the conduit. The coping 11 as in Fig. 1, is provided with a lifting handle 13 of any suitable kind with supporting flanges 14 interfitting with the upper portion of the bowl to make a tight fit thereon; or the coping may be made as indicated in Fig. 4, with a removably inserted top portion 15. With either construction, upon flushing, the water and contents of the bowl will pass upwardly within the coping 11 and downwardly through conduit 6 and outwardly to the sewer, by siphoning action, the bowl again re-filling with water after the operation, in the well known manner.

If for any reason the conduit 6 or pipe below becomes congested or obstructed, the coping 11 may be withdrawn and the obstruction removed by inserting any suitable implement, its facility for such purpose being due to the clearance upon removal of the coping.

An advantage of the partition 12 is that it also provides a bottom for the upper chambered cavity of the coping, whereby it may be used as a receptacle for utensils, etc.

The exact construction, arrangement or proportion of parts may be changed or varied by the skilled mechanic, but all such changes are to be considered as within the scope of the following claims.

What I claim is:—

1. In an excrement bowl, the combination of a main bowl having an upwardly extending integral outlet conduit, and a surrounding coping with an intervening space, forming with the bowl and its conduit a dissectible siphon, substantially as set forth.

2. In an excrement bowl, the combination of a main bowl having an upwardly extending integral outlet conduit, and a surrounding coping with an intervening eccentrically located space, forming with the bowl and its conduit a dissectible siphon, substantially as set forth.

3. In combination, an excrement bowl having a main bowl cavity and an upwardly extending integral outlet conduit projecting into the main cavity and at one side thereof and having an upper coping-receiving aperture, and a coping adapted to be fitted thereinto and surrounding the upper end of the outlet conduit with an intervening eccentrically arranged opening, providing a dissectible trap or siphon structure, substantially as set forth.

4. In a device of the class described, the combination with a bowl having an outlet conduit extending upwardly into the bowl cavity, of a coping inserted downwardly into the bowl cavity and provided with a transverse partition and extended lower walls adapted to embrace the terminal of the conduit with an intervening space, substantially as set forth.

In testimony whereof I affix my signature in presence of two witnesses.

WILLIAM GORDON MILLER.

Witnesses:
C. M. CLARKE,
CHAS. S. LEPLEY.